US007062769B1

(12) United States Patent
Ma et al.

(10) Patent No.: US 7,062,769 B1
(45) Date of Patent: Jun. 13, 2006

(54) OBJECT-ORIENTED PROCESSOR DESIGN AND DESIGN METHODOLOGIES

(75) Inventors: Wei Ma, Castro Valley, CA (US); K. Y. Martin Lee, San Francisco, CA (US); Kambiz Homayounfar, Tokyo (JP)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/348,783

(22) Filed: Jul. 7, 1999

(51) Int. Cl.
*G06F 3/00* (2006.01)
*G06F 9/44* (2006.01)
*G06F 9/46* (2006.01)
*G06F 13/00* (2006.01)

(52) U.S. Cl. .......................................... 719/312; 716/7
(58) Field of Classification Search ................ 709/1, 709/100, 213–216; 712/1, 3, 13, 28–36; 718/100–108; 703/1; 716/1–21; 719/312
See application file for complete search history.

(56) References Cited

U.S. PATENT DOCUMENTS

| | | | | |
|---|---|---|---|---|
| 4,641,238 | A * | 2/1987 | Kneib | 710/110 |
| 5,261,095 | A * | 11/1993 | Crawford et al. | 717/149 |
| 5,513,369 | A * | 4/1996 | Patel et al. | 712/29 |
| 5,623,684 | A | 4/1997 | El-Ghoroury et al. | |
| 5,708,838 | A * | 1/1998 | Robinson | 709/202 |
| 5,854,904 | A | 12/1998 | Brown | |
| 5,867,400 | A | 2/1999 | El-Ghoroury et al. | |
| 5,946,487 | A * | 8/1999 | Dangelo | 717/148 |
| 6,567,837 | B1 * | 5/2003 | Robinson | 709/1 |

\* cited by examiner

*Primary Examiner*—William Thomson
*Assistant Examiner*—Diem Cao

(74) *Attorney, Agent, or Firm*—Armstrong Teasdale LLP

(57) ABSTRACT

A distributed processing system having a host processor including a host communication infrastructure (HCI) configured for communication with said host processor; a plurality of class processors each having an associated private localized read/write memory; and a plurality of application program interface modules each configured to provide an interface between said host communication infrastructure and at least one said class processor, wherein each said class processor responds to selected data messages on said HCI to perform selected computations utilizing said read/write memory. This embodiment provides an ideal architecture for fabrication on a single chip and avoids processor and bus bottlenecks by providing distributed processing power with local memory for each class processor.

Also provided is a method for designing a distributed processing system for an application. The method includes steps of partitioning the application into functions and data messages; configuring a host processor having a host communication infrastructure (HCI) to pass data messages via the HCI to control the application; configuring a plurality of class processors to compute the functions into which the application is partitioned in response to the data messages; and interconnecting the class processors to the host processor via application program interface modules in a star configuration. Systems designed in accordance with this method embodiment are well-suited for integration on a single chip, and can be easily updated and modified as necessary, because changes made to a class processor have minimal effect on the remainder of the system.

19 Claims, 2 Drawing Sheets

OBJECT-ORIENTED PROCESSOR DESIGN AND DESIGN METHODOLOGIES

BACKGROUND OF THE INVENTION

This invention relates generally to methods for object-oriented hardware design and to hardware produced thereby, and more particularly to distributed memory, object-oriented, class-based methods for processor design and the processors produced thereby.

Voice over Internet protocol (VoIP), wideband code division multiple access (WCDMA), third generation wireless networks, and other advanced wireless and wired broadband communication systems require many complex, computationally-intensive signal processing functions. Examples of such functions include orthogonal frequency division multiplexing (OFDM) modems, Viterbi decoders, and Reed-Solomon decoders. In many cases, it is desirable for these signal processing functions to be fabricated on a single-chip integrated circuit.

One known methodology for placing such highly complex systems on a single chip is to provide powerful computational platforms on the chip to process all functions in a sequential manner in conjunction with a number of tightly-coupled intellectual property (IPs) cores, i.e., special-purpose processor and firmware layouts that are licensed for use in chip layouts for more complex processors. Computational platforms used in this design methodology include one or more microprocessors or digital signal processors (DSPs) and one or more standard or proprietary communication backbones, interface buses, or virtual sockets to connect all the necessary components into a unified environment. Such platforms can be characterized as being "processor-centric," because the various processors and IP cores share complex bus architectures to process all of the functions and algorithms sequentially. As systems become larger and more complex, even more powerful core processors are required.

Although presently known signal processing architectures and design methodologies are sufficient for many present applications, it is becoming increasingly difficult to meet processing demands of new applications with these architectures for several reasons. First, newer bus and controller architectures have become very complicated because memory speed cannot keep up with the increasing speed of central processing units (CPU), even with cache memory. Thus, there is a CPU-memory bottleneck that manifests itself in faster applications due to physical propagation factors whenever the silicon die area used by a processor is sufficiently large. Second, present architectures require a costly investment in very large and complex software. When suitable software is written, it is necessarily operating system (OS) dependent, because such dependency is required to ensure that each process receives an appropriate time slice of the CPU's computational resources. Whenever changes to a processor are necessary or a move is made to another OS platform, the prior effort and investment in developing the application software are largely wasted or rendered obsolete. Third, computational demands on processor-centric architectures require increased computational speed as the processes themselves become more complex. Increases in computational speed necessarily raise power consumption.

It would therefore be desirable to provide methods for designing complex application processors that avoid CPU memory bottlenecks due to large silicon die areas. It would also be desirable to provide a processor architecture that provides reduced dependence upon an operating system of any particular core processor and a design method that provides greater freedom to redesign the application processor around a different host processor. It would also be desirable to provide an application processor architecture in which smaller functional sets not requiring a single high-speed processor are performed relatively independently of one another, thereby avoiding the CPU-memory bottleneck.

BRIEF SUMMARY OF THE INVENTION

There is therefore provided, in one embodiment of the present invention, a distributed processing system having a host processor including a host communication infrastructure (HCI) configured for communication with said host processor; a plurality of class processors each having an associated private localized read/write memory; and a plurality of application program interface modules each configured to provide an interface between said host communication infrastructure and at least one said class processor, wherein each said class processor responds to selected data messages on said HCI to perform selected computations utilizing said read/write memory. This embodiment provides an ideal architecture for fabrication on a single chip. This embodiment also avoids processor and bus bottlenecks by providing distributed processing power with local memory for each class processor.

There is also provided, in another embodiment of the present invention, a method for designing a distributed processing system for an application. The method includes steps of partitioning the application into functions and data messages; configuring a host processor having a host communication infrastructure (HCI) to pass data messages via the HCI to control the application; configuring a plurality of class processors to compute the functions into which the application is partitioned in response to the data messages; and interconnecting the class processors to the host processor via application program interface modules in a star configuration. Systems designed in accordance with this method embodiment are well-suited for integration on a single chip, and can be easily updated and modified as necessary, because changes made to a class processor have minimal effect on the remainder of the system.

Other advantages of these embodiments and the others disclosed herein will become apparent to those skilled in the art upon reading the detailed description in conjunction with the accompanying drawings.

DETAILED DESCRIPTION OF THE INVENTION

Figure 1:
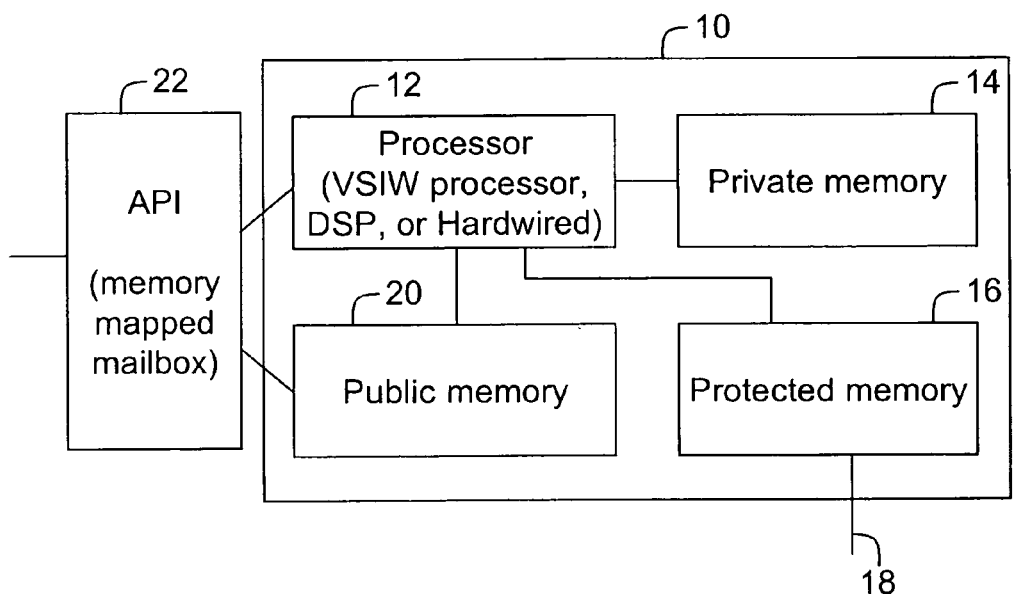
FIG. 1 is a drawing of a block diagram of an embodiment of a class processor of the present invention.

As used herein, the term "object-oriented" refers to a paradigm in which variables and command statements operating on the variables are termed "objects," variables associated with an object are called "attributes," and functions that operate on them are termed "methods." "Encapsulation" refers to a feature provided by the object oriented paradigm in that the only way to operate on, view, or otherwise alter, read, or access attributes of an object is by invoking the object's methods.

In one embodiment of the present invention, distributed processing system hardware is designed in accordance with the object-oriented paradigm. An application, for example, a physical layer processor for a communication system, is divided into active entities, i.e., signals, processing units, and defined transformations of signals. A correspondence is drawn between signals and objects and between transformations and methods, with transformations being defined as mathematical operations that are performed on signal objects. In cases in which it is possible to divide the application into active entities in more than one manner, a division is selected that localizes resources needed for implementation so that communication with other functions is reduced or minimized. This criterion reduces a potential for system conflicts and also reduces timing overhead for coordinating shared resources.

For example, a physical layer processor of a type suitable for some applications is partitioned according to this method embodiment into (1) an A/D converter for converting an analog signal into a time domain digital signal "A;" (2) a standalone FFT using radix-2 to transform time domain digital signal "A" into a frequency domain signal "B," the standalone FFT processor including twiddle factor coefficients and many repeated operations; (3) a Viterbi or convolutional decoder to decode signal "B" into a signal "C" using a read/write memory; (4) a standalone FFT using a radix-4 transform to convert signal "C" to signal "D" and including other twiddle factor coefficients and many repeated operations; and (5) a multiplexer to take signal "D" to a host processor in the form of another digital signal "E." It follows from the above partitioning and from the definition of an object, that signals A, B, C, D, and E are objects. It also follows that an analog to digital conversion, a fast Fourier transformation, a convolutional decoding, and a multiplexer mapping operation are methods. Computational engines that implement the methods are also identified as objects. Twiddle factors and memory are identified as attributes of objects, because they are attributes of the computational engines.

Groups of related functions and objects are then selected with an objective of minimizing communication between functional groupings, although it will be understood that not all application processors will be broken down into functions and objects that can be grouped in this manner. For example, a Fourier transform class providing an FFT and a DFT is recognized as a class grouping. Each computational object is configured to respond to requests from at least a host processor, such requests being defined as predefined or selected data messages that differ for each function. The transfer of messages between function processors, which henceforth are referred to as "class processors", allows relatively intense computation to be performed by the class processors without excessive loading of a host processor data bus.

Referring now to FIG. 1, an exemplary embodiment of a class processor 10 of the present invention comprises a special purpose processor 12. Suitable special purpose processors 12 include, but are not limited to, a very short instruction word (VSIW) processor, a digital signal processor (DSP), an application specific integrated circuit (ASIC) processor, a suitably-programmed microprocessor subcomponent, and hardwired components. In one embodiment in which class processor 10 is an FFT processor, special purpose processor 12 is a VSIW DSP processor. In one embodiment in which class processor 10 is a RAKE finger receiver, special purpose processor 12 is an ASIC processor.

In one embodiment, special purpose processor 12 includes software or firmware (not shown) to provide a portion of its functionality.

Depending upon functions to be performed by class processor 10, one or more localized read/write memories 14, 16, and 20 are provided and interconnected with special purpose processor 12 so as to be directly accessible to it, i.e., visible and addressable in its memory space. Memory 14 is a private localized read/write memory 14 that is used by and is accessible only by special purpose processor 12 through its implemented methods. Memory 16 is a localized protected read/write memory that is used by special purpose processor 12 to store and/or read data accessible only by other class processors 10 of the same grouping or class. For example, where class processor 10 is a fast Fourier transform (FFT) processor, another class processor 10 (not shown in FIG. 1) that implements a similar function or functions is able to access protected memory 16. Examples of two class processors sharing protected localized read/write memory 16 are two FFT processors used at the same time, or an FFT processor and a discrete Fourier transform (DFT) processor that computes discrete Fourier transforms somewhat differently, for example, using a Winograd DFT. Access to protected localized read/write memory 16 is provided by one or both of a direct interconnection 18 from protected localized read/write memory 16 to the other class processor 10 or by providing special purpose processors 12 of each class processor 10 belonging to the same class with special knowledge of messages that can be passed between class processors 10 of that class. Memory 20 is a public read/write memory that can be addressed by other components, including a host processor (not shown in FIG. 1). In one embodiment, public read/write memory is directly accessible via a memory mapped mailbox or an application program interface (API) module 22. It will be recognized by those skilled in the art that not all embodiments of class processors 10 require all three types of memories 14, 16, and 20. API module 22 comprises a communication port, for example, a hardware or software communication port that including a memory-mapped dual port memory bank. In another embodiment, API module 22 includes a memory stack.

Figure 2:
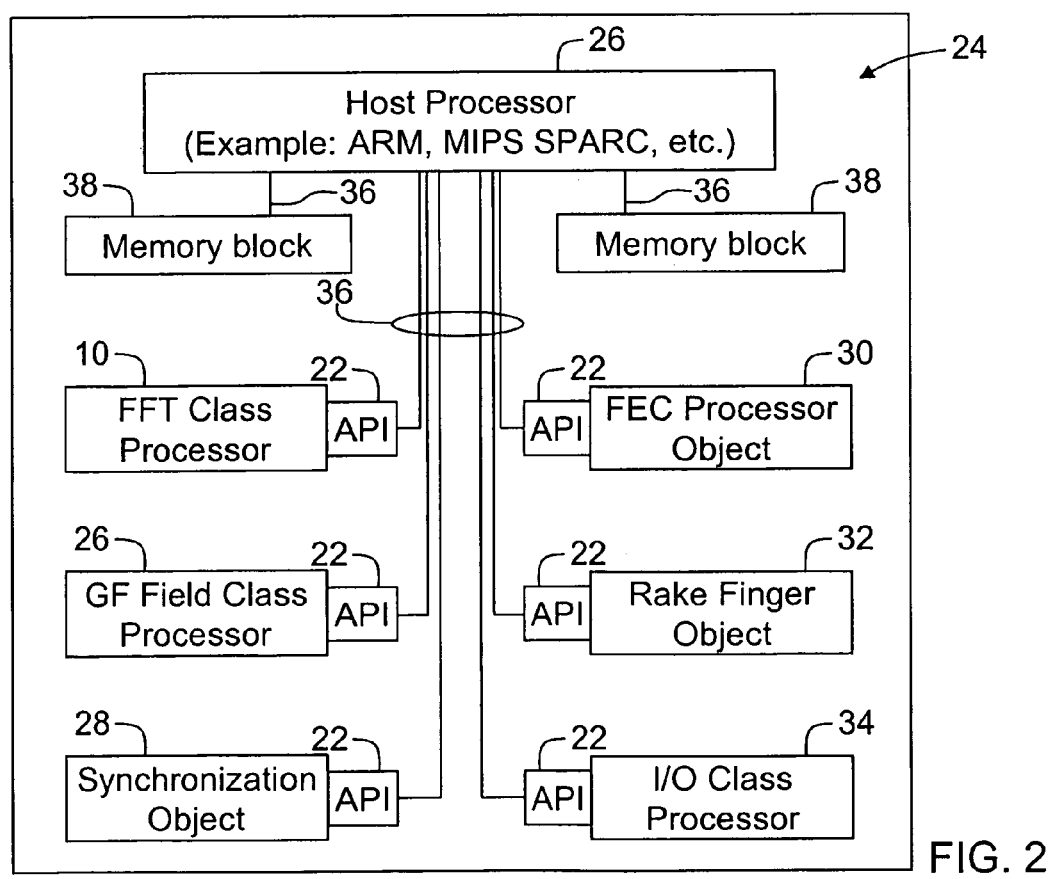
FIG. 2 is a drawing of a block diagram of an embodiment of a physical layer processor of the present invention.

In another embodiment and referring to FIG. 2, a block diagram of an exemplary physical layer communications processor 24 is shown. In this example, processor 24 is an object oriented communications signal processor (OOCSP) fabricated on a single chip. OOCSP 24 comprises a host processor 26 and various functional class processors 26, 28, 30, 32, and 34 in addition to an embodiment of FFT class processor 10 of FIG. 1. Host or main processor 24 is a standard microprocessor embodiment or "IP core." The invention places no restriction on the type of host processor 24. Exemplary host processors 24 useful for this embodiment are ARM, MIPS, x86, 68xxx, TMS320, DSP16xxx and DSP56xxx series processors. Each of these host processors is characterized by a native host communication infrastructure (HCI) 36, which includes a bus and a port configuration.

Class processors 10, 26, 28, 30, 32, and 34 provide computational power for invoking methods of data or signal objects for OOCSP 24. For the embodiment exemplified by FIG. 2, the class processors are implemented as hard IPs and are FFT class processor 10, Galois field (GF) field class processor 26, synchronization object 28, forward error correction (FEC) object 30, Rake finger object 32, and I/O class processor 34, the latter being provided to increase data pumping capabilities of OOCSP 24 beyond that already provided by native I/O processing of host processor 26. Class processors 10, 26, 28, 30, 32, and 34 are each designed to processes certain specialized functions and no others on data structures, or in other words, each performs operations on a selected proper subset of application objects. Each class processor 10, 26, 28, 30, 32, and 34 is an application oriented functional unit programmable for its intended application. For example, FFT class processor 10 can initiate various real and complex FFT operations at different wordlength accuracy, and is the hardware analog to an object-oriented language class. The functions of class processors 10, 26, 28, 30, 32, and 34 are selected and grouped to enhance abstraction, i.e., making the action of OOCSP 24 more readily accessible to a programmer of host processor 26, and to enhance encapsulation, i.e., hiding of internal workings of each class. Memory 38 is also provided for programming and local data storage of host processor 26. For efficiency and speed, memory 38 is organized in a native structure of host processor 26, whether it is provided internally or externally to host processor 26. Memory 38 is of a suitable type (e.g., RAM, ROM, DRAM, eDRAM, etc.) and amount needed for host processor 26 to control the functions of class processors 10, 26, 28, 30, 32, 34 and their communication with host processor 26.

In the embodiment of FIG. 2, APIs 22 provide communication between class processors 10, 26, 28, 30, 32, and 34 and other subsystems, including host processor 26 and other class processors. Each API 22 provides "public visibility" by providing an interface to HCI 36. Each API 22 provided to a different class processor 10, 26, 28, 30, 32, and 34 implementing different functions is slightly different, in that each provides a visibility to host processor 26 for its respective class processor that effectively defines a programming interface for its class processor. Thus, the API of a class effectively describes what a class can do, while implementation of the class describes how it does it, in a manner analogous to application programming interfaces of software programs. Particular implementation of APIs 22 is a design choice, in that APIs 22 can be a virtual socket interface or any type of bus communication or I/O port data exchange mechanism. Use of a memory mapped dual port RAM bank, stack, and FIFO memory permits native HCI 36 to be easily maintained.

It will be observed that OOCSP 24 provides a number of advantages over known processors. First, communication among class processors 10, 26, 28, 30, 32, and 34 is restricted, in that in the embodiment of FIG. 2, no class processor has any knowledge of any other class processor or any ability to communicate with any other class processor. All communication is with host processor 26, i.e., OOCSP 24 is arranged in a "star" configuration. No complex, fast busses are needed. Because class processors 10, 26, 28, 30, 32, and 34 each provide separately implemented functions with a defined interface, no class processor has any particularized knowledge of the internal workings of any other class processor, and class processors are referred to only through their defined interfaces. Each class processor has all the memory it requires in close proximity to itself to reduce propagation delays, and the minimization of public or global memories and data structures is kept to a minimum to limit the opportunity for class processors to affect one another. Because of abstraction and data hiding behind a defined interface, class processors 10, 26, 28, 30, 32, and 34 can be provided as hard IP objects that can be used without concern as to their inner workings. Moreover, any changes to one of the class processors has only minimal, if any, effect on the operation of others, so the effect of design revisions is localized. Also, class processors that are closely coupled to the host processor or to other class processors (i.e., that require frequent or speedy, low propagation delay access to one another) can be placed close to one another on a chip.

Figure 3:
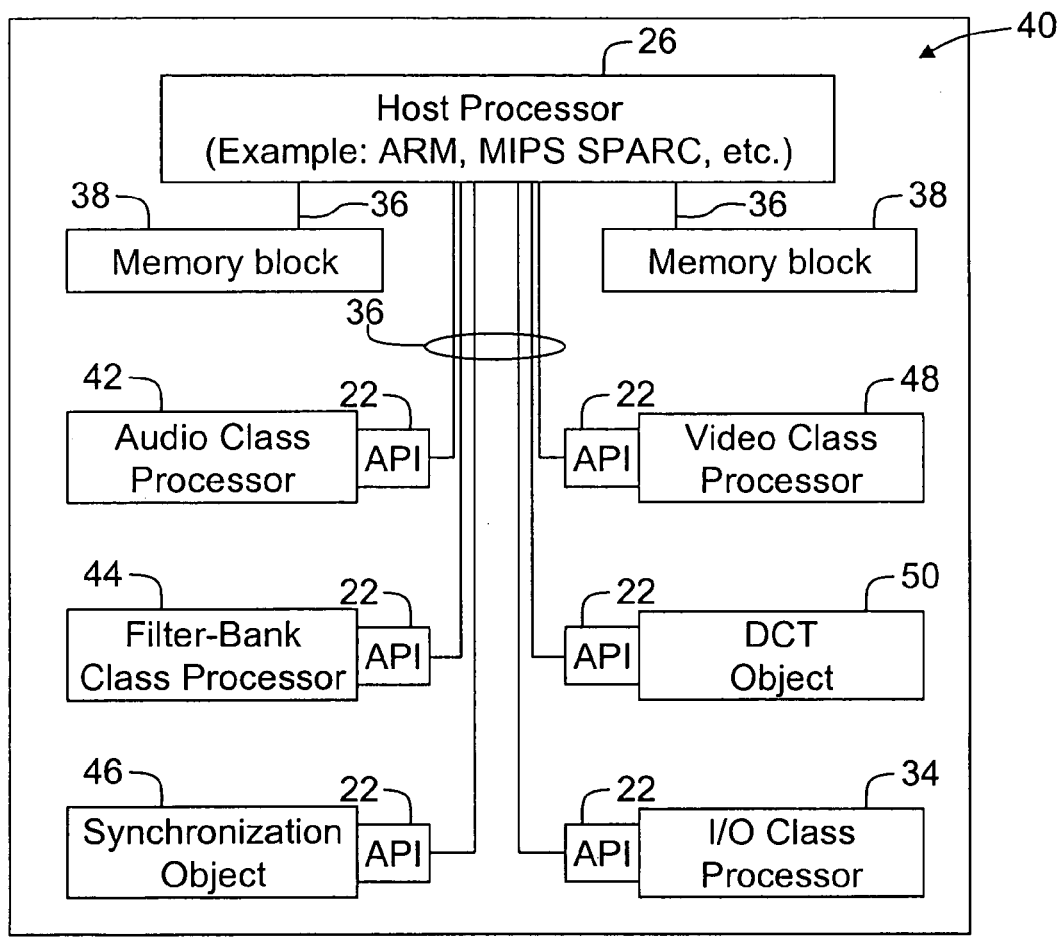
FIG. 3 is a drawings of a block diagram of an embodiment of an application layer processor of the present invention.

In another embodiment and referring to FIG. 3, a block diagram of a single-chip OOCSP application layer processor 40 is shown. Although designed for a different purpose, the architecture of application layer processor 40 is similar to that of physical layer processor 24 of FIG. 2, except that host processor 26 and HCI 36 communicate with class processors 42, 44, 46, 48, 50, and 34, most of which are different from those comprising physical layer processor 24. More particularly, application layer processor 40 comprises an audio class processor 42, a filter bank class processor 44, a synchronization object 46 a video class processor 48, a discrete cosine transform (DCT) object and an I/O class processor 34. This example shows the reuse of I/O class processor 34, which is made possible, in part, because of the loose coupling, i.e., data hiding and encapsulation, of the object-oriented design paradigm. Synchronization object 46 is related to synchronization object 28, but differ because synchronization methods applicable to a physical layer and to an application layer are, in general, somewhat different. Class processors 42, 44, 46, 48, 50 and 34 are arranged so that those functions that would be most adversely affected by propagation delays are electrically closest to host processor 26 in that propagation delays are minimized. For further efficiency, although not shown in the embodiments of FIG. 2 or 3, related class processors, i.e., those of the same class, share a protected localized read/write memory 16 in other processor embodiments. Sharing is accomplished in one embodiment by direct coupling of memory 16 via a semi-private bus 18 to the sharing class processor or processor, or in another embodiment by configuring processors 12 of class processors of the same class to communicate messages to one another through their APIs 22, either by direct communication with one another or indirectly through a host processor 26. Otherwise, class processors have no knowledge of communication protocols of class processors not in the same class and thus, cannot communicate with or reference the other processors, and memories 16 are not directly or indirectly accessible to class processors of different classes. In one embodiments, class processors are provided with public memories 20 that are addressable by host processor 26 via HCI 36 and API 22, such as by memory mapping.

From the preceding description of various embodiments of the present invention, it is evident that complex processors are produced from the design methodologies of embodiments of the present invention without CPU memory bottlenecks due to large silicon die areas, because of data hiding and the providing of localized private memories for class processors. Moreover, the application processor architecture resulting from embodiments of the present invention isolate host processors from the complexity of the functions provided by the class processors with an application programming interface, so that the resulting architectures are relatively independent of an operating system running on the host processor. Also, the functional decomposition of the application processor allows greater freedom to change host processors and removes high speed processing constraints by shifting much of the processing load to specialized processors rather than the host processor.

Although the invention has been described and illustrated in detail by reference to specific embodiments, it is to be clearly understood that the same is intended by way of illustration and example only and is not to be taken by way of limitation. For example, one skilled in the art will recognize that one can build up a collection of reusable objects, classes, and class hierarchies for different applications, their reuse being facilitated by their appearance to a programmer of a host processor as simple API module calls. Reuse and design validation is further enhanced and facilitated because software simulators of object-oriented classes and their associated objects can be made identical in behavior to the processors themselves to allow rapid and accurate software development and final compilation and integration of an overall device. Indeed, devices designed using method embodiments of the present invention can be implemented using technologies analogous to software compilers. It will also be observed that the invention is generally applicable to many different applications, including, for example, user-layer applications such as object-oriented HDTV processors and object-oriented audio processors, and also to applications not related to signal processing, as such. Because of the modularity of design provided by the present invention, the present invention can be used in the design of, and incorporated into the architecture of "super" OOCSP platforms in which different OOCSP cores are combined. Accordingly, the spirit and scope of the invention are to be limited only by the terms of the appended claims.

The invention claimed is:

1. A distributed processing system comprising:
    a host processor including a host communication infrastructure (HCI) configured to provide communication with said host processor;
    a plurality of class processors each comprising an associated private localized read/write memory, an associated protected localized read/write memory, and public localized read/write memory; and
    a plurality of application program interface modules each configured to provide an interface between said host communication infrastructure and at least one said class processor, said application program interface modules each defining a programming interface for a respective said class processor, wherein each said class processor responds to selected data messages on said HCI to perform selected computations utilizing said read/write memory.

2. A distributed processing system in accordance with claim 1 wherein said distributed processing system is integrated onto a single chip substrate.

3. A distributed processing system in accordance with claim 2 wherein each of said plurality of class processors is configured to perform operations on a selected proper subset of application objects.

4. A distributed processing system in accordance with claim 3 wherein said processors are configured to reference other class processors, if at all, only through their respective application program interface modules, without reference to data structures operated upon by said other referenced class processors.

5. A distributed processing system in accordance with claim 2 wherein said plurality of class processors comprise a plurality of classes of class processors, wherein each said class processor comprises an associated protected localized read/write memory accessible only to itself and to at least one other said class processor of the same class.

6. A distributed processing system in accordance with claim 5 further comprising semi-private busses coupled to said class processors of said same class providing access to said protected localized read/write memory.

7. A distributed processing system in accordance with claim 5 wherein said plurality of class processors each further comprise a special purpose processor coupled to said private localized read/write memory, and public read/write memory, and said public read/write memory is configured to be addressable both to said host processor via said HCI and to said special purpose processor.

8. A distributed processing system in accordance with claim 2 wherein said plurality of class processors comprise a plurality of classes of class processors, and said distributed processing system is configured to restrict direct data communication between said class processors to data communication between class processors of the same class.

9. A distributed processing system in accordance with claim 8 comprising at least a first said class processor and a second said class processor of the same class, said first class processor further comprises a protected localized read/write memory, and said first and second class processor are configured so that said protected localized read/write memory of said first class processor is addressable by said second class processor.

10. A distributed processing system in accordance with claim 9 wherein said public localized read/write memory and said class processor having said public localized read/write memory are configured so that said public localized read/write memory is addressable by said host processor.

11. A distributed processing system in accordance with claim 2 wherein said class processors are controlled and activated by said host processor.

12. A distributed processing system in accordance with claim 11 wherein said class processors are controlled and activated by said host processor exclusively via said application program interface modules.

13. A method for designing a distributed processing system for an application, said method comprising the steps of
    partitioning the application into functions and data messages;
    configuring a host processor having a host communication infrastructure (HCI) to pass data messages via the HCI to control the application;
    configuring a plurality of class processors to compute the functions into which the application is partitioned in response to the data messages;
    configuring each class processor with an associated private localized read/write memory, an associated protected localized read/write memory, and public localized read/write memory; and
    interconnecting the class processors to the host processor via application program interface modules in a star configuration, the application program interface modules each defining a programming interface for one or more respective class processors.

14. A method in accordance with claim 13 further comprising the step of protecting the private localized read/write memory from being read and from being altered by the host processor and the other class processors, except in response to predefined data messages sent to an application program interface module instructing the class processor to execute a function.

15. A method in accordance with claim 14 further comprising the steps of:
    forming the distributed processing system on an integrated circuit chip; and
    locating class processors for executing functions most frequently required by the application most physically proximate the host processor on the integrated circuit chip.

16. A method in accordance with claim 15 further comprising the steps of:
grouping functions into groups of related functions;
interconnecting a group of class processors for executing a group of related functions, the group of class processors including the class processor having the protected read/write memory; so that the protected read/write memory is accessible to a plurality of the group of class processors; and
protecting the protected read/write memory from being read and from being altered by the host processor and other class processors not in the group of class processors.

17. A method in accordance with claim 14 wherein partitioning the application into functions and data messages comprises the steps of:
identifying signals as objects and transforms of signals as functions; and
grouping functions into groups of related functions independent of others of the groups of related functions; and
configuring each of the plurality of class processors to compute a group of related functions to reduce communication between class processors and the host processor.

18. A method in accordance with claim 17 wherein grouping functions into groups of related functions comprises grouping functions into groups of related functions that have independent data structures, and configuring each of the plurality of data structures comprises configuring each of the class processors to have no knowledge of data structures in other class processors and to communicate with other class processors only through their respective application programming interface modules.

19. A method in accordance with claim 13 wherein interconnecting the class processors to the host processor via application program interface modules in a star configuration comprises the steps of interconnecting the class processors to the host processor via at least one member of the group of interconnections consisting of virtual socket interfaces, I/O port data exchange interfaces, memory mapped dual port random access memory (RAM) banks, stacks, and first-in-first out (FIFO) memory.

\* \* \* \* \*